United States Patent [19]

Bourge et al.

[11] Patent Number: 5,050,185
[45] Date of Patent: Sep. 17, 1991

[54] PROCESS AND APPARATUS FOR MEASURING THE INSTABILITY OF AN ARC IN AN ELECTRICAL ARC FURNACE FOR PROCESSING LIQUID METAL

[75] Inventors: Michel Bourge, Arnaville; Gilbert Engler, Woippy; Ghislain Maurer, Chatel-St-Germain, all of France

[73] Assignee: Institut de Recherches de la Siderurgie Francaise (IRSID), Puteaux, France

[21] Appl. No.: 536,400

[22] Filed: Jun. 12, 1990

[30] Foreign Application Priority Data

Jun. 15, 1989 [FR] France .................. 89 07951

[51] Int. Cl.⁵ ............................................ H05B 7/148
[52] U.S. Cl. ................................. 373/104; 373/47; 373/49; 373/50; 373/102; 373/105; 373/104
[58] Field of Search .............. 373/104, 105, 106, 42, 373/47, 49, 50, 102

[56] References Cited

U.S. PATENT DOCUMENTS 4,395,771 7/1983 Medovar ............................... 373/49
4,852,119 7/1989 Montgomery ....................... 323/49

FOREIGN PATENT DOCUMENTS 3149175 6/1983 Fed. Rep. of Germany .
63-220978 9/1988 Japan .

Primary Examiner—Bruce A. Reynolds
Assistant Examiner—Tu Hoang
Attorney, Agent, or Firm—Cushman, Darby & Cushman

[57] ABSTRACT

According to this process and this device:
  a signal representing the derivative of the intensity of the current in the arc is sensed,
  the sensed signal is amplified,
  the amplified signal is directed simultaneously into two band pass filters (6, 7) respectively having a high frequency broad band (6) and having a narrow band centered on a low fundamental frequency (7),
  the signals emanating from the filters (6, 7) are transmitted to effective value extractors (8, 9),
  by means of a divider module (11) an energy signal is formulated, which is proportional to the ratio of the effective value of the signal emanating from the broad band filter (6) and the effective value of the signal emanating from the narrow band filter (7),
  and the proportional energy signal obtained is displayed on a scale (12), where it is expressed as a percentage, this percentage being indicative of the behaviour of the arc, signifying the formulation phase. The signal supplied by the display element (12) permits the regulation of the furnace in real time by the control operator.

9 Claims, 1 Drawing Sheet

PROCESS AND APPARATUS FOR MEASURING THE INSTABILITY OF AN ARC IN AN ELECTRICAL ARC FURNACE FOR PROCESSING LIQUID METAL

The present invention relates to a process and a device for measuring the instability of an arc in an electrical furnace for processing liquid metal, in particular in a steel works.

It is known that the characteristics of the arc of an electrical furnace are liable to vary during a liquid metal processing.

Moreover, the slag which floats on top of the liquid metal bath undergoes, during the refining of the steel, a foaming caused by the chemical reactions in the liquid metal and in the slag, which are consequent upon the injection of oxygen and of carbon through blast pipes respectively into the liquid metal and into the slag. In fact, the injection of oxygen causes the formation of iron oxide which passes into the slag, where the injection of charcoal causes the formation of carbon oxide which causes the slag to foam. Thus, the arc is to a greater or lesser extent immersed in the layer of slag during the refining process.

Now, it has been found that there is a correlation between the distortion of the intensity of the current in the electric arc and the foaming of the slag. In fact, the foaming has an effect on the characteristics of the electric arc, namely its voltage and the intensity of the current.

Thus, the object of the invention is also to permit the management of the process in the furnace on the basis of the development of the foaming of the slag.

The process according to the invention is thus characterized in that:

a signal representing the derivative of the intensity of the current in the arc is sensed, the sensed signal is amplified, the amplified signal is directed simultaneously into two band pass filters respectively having a high frequency broad band and having a narrow band centered on a low fundamental frequency, the signals emanating from the filters are transmitted to effective value extractors, by means of a divider module, an energy signal is formulated, which is proportional to the ratio of the effective value of the signal emanating from the broad band filter and the effective value of the signal emanating from the narrow band filter, and the proportional energy signal obtained is displayed on a scale where it is expressed as a percentage, this percentage being indicative of the behaviour of the arc, signifying the formulation phase.

In the case where the layer of slag actually undergoes a foaming during the process, the arc thus being immersed in the foam, the proportional energy signal obtained is utilized as an indicator of the degree of immersion of the arc in the foaming slag, the value of the said signal tending towards a minimum when the foaming of the slag causes a maximum immersion of the arc.

In this manner, a measurement is made of the harmonic distortion of the current, which constitutes an image of the stability of the arc, which stability is improved when the arc is immersed in the foam. The operators managing the operation of the furnace then have available an indicator permitting them to undertake regulation operations in real time, to regularize the setpoint values between the teams, and to supply an SPC (statistical process control) indicator.

The device for carrying out this process comprises:

a sensor of a signal representing the derivative of the intensity of the current passing in the arc, an amplifier of the said signal, two band pass filters connected to the amplifier, one of which has a high frequency broad band and the other of which has a narrow band centered on a low fundamental frequency, two effective value extractors connected respectively to the said filters, a divider module connected to the extractors and capable of formulating an energy signal proportional to the ratio of the effective value of the signal emanating from the broad band filter and the effective value of the signal emanating from the narrow band filter, an element for the display in the form of a percentage of the proportional energy signal delivered by the divider module, and a possible link with a computer.

Further particular features and advantages of the invention will become evident in the course of the description which will follow, which is made with reference to the accompanying drawing which illustrates an embodiment thereof by way of non-limiting example.

Figure 1:
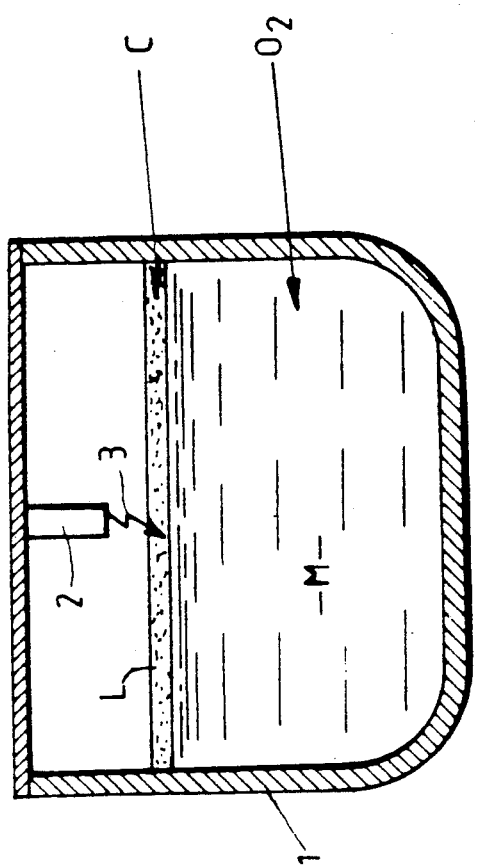
FIG. 1 is a view in diagrammatic cross-section of an electrical furnace for the processing of liquid metal.

The electrical furnace of FIG. 1 comprises an electrode 2 and contains a liquid metal bath M. On top of the liquid metal M there is during the process a layer L of slag, which layer is traversed to a variable degree by the electric arc 3.

Blast pipes (not shown),-which are symbolized by the arrows passing through the wall of the furnace 1, permit the injection respectively of oxygen into the liquid metal M and of charcoal into the slag L. These injections cause chemical reactions in the bath and in the slag, which, in their turn, cause a foaming of the latter, within which the arc 3 is therefore immersed to a greater or lesser extent; this has an effect on the voltage and the current in the arc.

Figure 2:
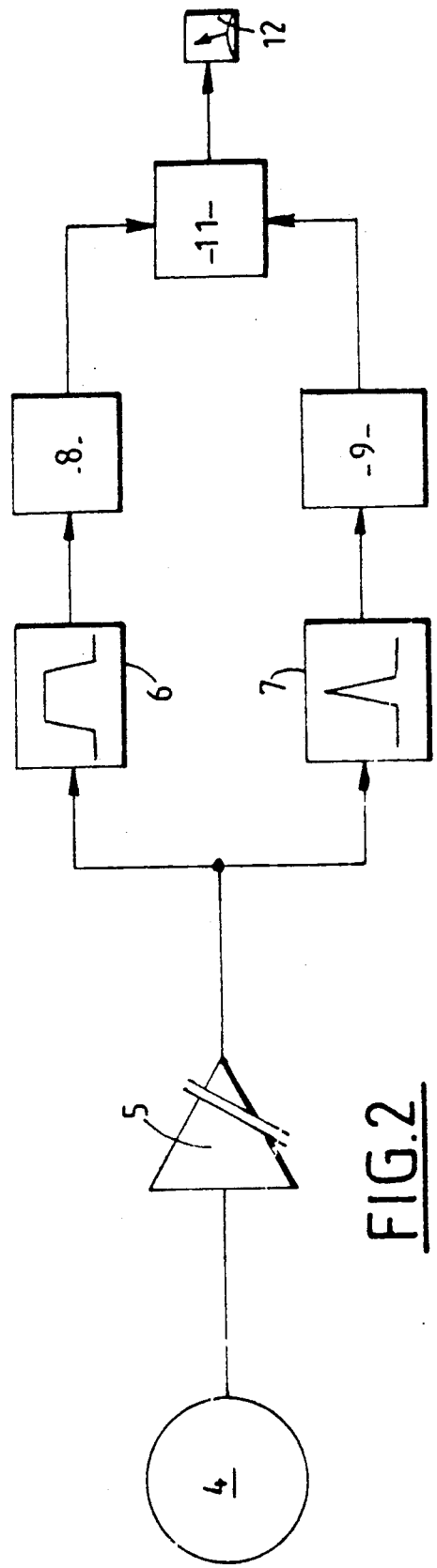
FIG. 2 is a general diagram of the device for carrying out the process for the measurement of the instability of the arc of the electrical furnace of FIG. 1.

In order to monitor the development of the foaming of the slag L and thus to permit interventions in the course of the process, the invention provides an electrical system, the circuit of which is shown in FIG. 2.

This measuring device thus comprises:

a sensor 4 of a signal representing the derivative di/dt of the intensity of the current passing through the arc, measured on one of the conductors of the secondary circuit of the furnace, an amplifier 5 of the signal supplied by the sensor 4, two band pass filters connected to the amplifier 5, one 6 of which has a high frequency broad band and the other 7 of which has a narrow band centered on a low fundamental frequency, two effective value extractors 8, 9 connected respectively to the said filters 6 and 7, a divider module 11 connected to the extractors 6, 7 and capable of formulating an energy signal proportional to the ratio of the effective value of the signal emanating from the broad band filter 6 and the effective value of the signal emanating from the narrow band filter 7;

and finally an element 12 for the display in the form of a percentage of the proportional energy signal delivered by the divider module 11.

The sensor 4 is of the inductive type, for example a Robowski torus, that is to say an electromagnetic ammeter which is capable of measuring the derivative of the current, and its harmonics. The use of a sensor of this type exhibits, in particular, the advantage of increasing the accuracy of the measurement of the fluctuations of the current, since its very broad pass band avoids a peak limiting of the high frequency components. The amplifier 5 is an isolation amplifier, for example using galvanic separation. The filters 6 and 7 dissociate the original signal into two branches in each filter. The filter 6 may thus be a band pass of 500 to 1,000 Hz with a gradient close to 50 dB/octave, while the filter 7 has a narrow band centered on a low frequency, for example 50 Hz in the case of a supply of the furnace with alternating current at industrial frequency. The two filters 6 and 7 thus effect the separation between the fundamental frequency component at 50 Hz and the frequency components situated within the band 500 to 1,000 Hz; this frequency band having proved to be of particular interest, as regards the accuracy of the measurement and of the processing of the signal, for carrying out the process.

The energy value of the two signals emanating from the two filters 6, 7 is obtained by the two effective value extractors 8, 9, the characteristics of which are identical ("root mean square"). The extractors 8 and 9 receive alternating signals at the input and deliver direct-current signals, and must have strictly the same integration characteristics.

The divider 11 computes the ratio of the energy values of the signals supplied by the extractors 8 and 9, the result of this computation being displayed on the element 12.

The signal supplied by the divider 11 may be considered as an indicator of foaming of the slag L on account of the fact that its value tends towards a minimum when the foaming of the slag causes a maximum immersion of the arc 3. Thus, the value of the quotient delivered by the divider 11 is a minimum when the foaming is a maximum (the arc 3 being entirely enveloped in foam) and vice versa.

This may be understood by the fact that the development of the foaming causes a diminution of the harmonics of the current, which causes, in its turn, a diminution of the ratio of the energy signal delivered by the extractor 8 to the energy signal delivered by the extractor 9.

Of course, the 500 –1,000 Hz zone given hereinabove is supplied only by way of example, since for a liquid metal bath M it is the richest in information. Outside this band, the closer is the approach to the fundamental frequency the greater is the necessity to use a steep-gradient filter. For this reason, an appropriate frequency window is selected The ceiling of 1,000 Hz proved, in the example given, to be appropriate, since beyond a certain frequency (which may be different from 1,000 Hz, for example 2,000 Hz) the additional information obtained is no longer useful.

The results supplied by the indicator 12 may be used in the following manner:

1. For the regulation, in real time, of the furnace 1 by the control operator. In fact, if the signal from the element 12 is a maximum, this means that the arc 3 is immersed to a very small extent in the foam and that it is necessary to implement a regulation of the operation of the furnace, for example a different positioning of the blast pipes for the injection of oxygen and of charcoal, or a regulation of the injection throughputs.

2. Optimization of the operation of the furnace. It is possible to supply to the indicator 12 setpoint values with which there will be associated specified types of intervention, for the regulation of certain parameters as a function of the recorded values.

In the absence of foaming of the slag L, the process according to the invention permits the monitoring of the behaviour of the arc 3, which is influenced by parameters other than the foaming. Thus, for example during the phases of fusion of the ladles of scrap iron with effect from a given percentage, for example 50 %, of the indicator 12, it will be known that the furnace is at the end of fusion, and that it is then necessary to recharge it in order to maintain a maximum yield. The process may thus be utilized in order to maintain the characteristics of the arc at constant values.

It will be noted that the filter 6, in the indicative example given hereinabove, may in fact be constituted by a succession of two filters having two cells, the first being 1,000 Hz low pass and the second being 500 Hz high pass. The gain is regulated to 0 or 20 dB, only the first cell being regulated to 20 dB for the measuring of the signals at the divider 11.

Nevertheless, a single filter 6 may be sufficient, with a first cell regulated to 1,000 Hz and a second cell regulated to 500 Hz, and the gain of one of the two to 20 dB.

The process and the device described hereinabove by way of example in the case of an alternating current furnace, may likewise be applied to direct current furnaces, the low fundamental frequency under consideration then being virtually zero, and the narrow band filter then being for example a 1 Hz low pass filter, it being possible for the high frequency band to be possibly broadened, for example, to 50–1,000 Hz.

What is claimed is:

1. Process for measuring the instability of an arc in an electrical furnace for processing a liquid metal, characterized in that:
   a signal representing the derivative of the intensity of the current in the arc is sensed,
   the sensed signal is amplified,
   the amplified signal is directed simultaneously into two band pass filters respectively having a high frequency broad band and having a narrow band centered on a low fundamental frequency,
   the signals emanating from the filters are transmitted to effective value extractors
   by means of a divider module, an energy signal is formulated, which is proportional to the ratio of the effective value of the signal emanating from the broad band filter and the effective value of the signal emanating from the narrow band filter,
   and the proportional energy signal obtained is displayed on a scale where it is expressed as a percentage, this percentage being indicative of the behaviour of the arc, signifying the formulation phase.

2. Process according to claim 1, carried out in a furnace in which the liquid metal bath is covered with a layer of foaming slag at least partially traversed by the arc, characterized in that the proportional energy signal obtained is utilized as indicator of the degree of immersion of the arc in the foaming slag, the value of the said signal tending towards a minimum when the foaming of the slag causes a maximum immersion of the arc.

3. Apparatus for measuring the instability of an arc in an electrical arc furnace, said apparatus comprising:

a sensor of a signal representing the derivative of the intensity of the current passing in the arc, an amplifier of the said signal, two band pass filters connected to the amplifier, one of which has a high frequency broad band and the other of which has a narrow band centered on a low fundamental frequency, two effective value extractors connected respectively to the said filters, a divider module connected to the extractors and capable of formulating an energy signal proportional to the ratio of the effective value of the signal emanating from the broad band filter and the effective value of the signal emanating from the narrow band filter, and an element for the display in the form of a percentage of the proportional energy signal delivered by the divider module.

4. Apparatus according to claim 3, characterized in that the sensor is of the inductive type.

5. Apparatus according to claim 3, characterized in that the amplifier is an isolation amplifier.

6. Apparatus according to claim 3, characterized in that the broad band filter can isolate a band within the range between 500 to 1,000 Hz approximately, and the narrow band filter can isolate a band centered on a fundamental frequency.

7. Apparatus according to claim 6, characterized in that the effective value extractors have identical integration characteristics.

8. Apparatus according to claim 4, wherein the sensor is a Robowski torus.

9. Apparatus according to claim 5, wherein the amplifier uses galvanic separation.

* * * * *